（12） United States Patent
Usui et al.

(10) Patent No.: US 7,046,597 B2
(45) Date of Patent: May 16, 2006

(54) OPTICAL DISK APPARATUS FOR RECORDING INFORMATION AT A RECORDING DENSITY PROPORTIONAL TO THE ACTUAL INFORMATION VOLUME AND DISK NOMINAL CAPACITY

(75) Inventors: Akira Usui, Hamamatsu (JP); Yukihisa Nakajo, Yokohama (JP)

(73) Assignee: Yamaha Corporation, Hamamatsu (JP)

( * ) Notice: Subject to any disclaimer, the term of this patent is extended or adjusted under 35 U.S.C. 154(b) by 386 days.

(21) Appl. No.: 10/207,302

(22) Filed: Jul. 29, 2002

(65) Prior Publication Data

US 2003/0021202 A1    Jan. 30, 2003

(30) Foreign Application Priority Data

Jul. 30, 2001  (JP) .............................. 2001-230392

(51) Int. Cl.
*G11B 7/00* (2006.01)
(52) U.S. Cl. ................................ 369/47.41; 369/47.39
(58) Field of Classification Search .............. 369/47.41
See application file for complete search history.

(56) References Cited

U.S. PATENT DOCUMENTS

| 4,884,147 | A |   | 11/1989 | Arimoto et al. |
|---|---|---|---|---|
| 5,381,275 | A |   | 1/1995 | Nitta et al. |
| 5,572,502 | A | * | 11/1996 | Naruse et al. .............. 369/116 |
| 5,825,733 | A |   | 10/1998 | Ogawa |
| 5,832,088 | A |   | 11/1998 | Nakajima et al. |
| 6,028,828 | A | * | 2/2000 | Maeda ...................... 369/47.4 |
| 6,226,241 | B1 |   | 5/2001 | D'Amato et al. |
| 6,411,579 | B1 | * | 6/2002 | Nobukuni et al. ....... 369/59.12 |
| 6,449,231 | B1 | * | 9/2002 | Numata ..................... 369/53.2 |
| 6,901,039 | B1 |   | 5/2005 | Sugie et al. |

FOREIGN PATENT DOCUMENTS

CN    1288231 A    5/2001

(Continued)

OTHER PUBLICATIONS

Notice of Rejection from Japanese Patent Office and English language translation , pp. 6, Patent Application No. 2001-230392, (Nov. 29, 2004).

*Primary Examiner*—Gautam R. Patel
(74) *Attorney, Agent, or Firm*—Pillsbury Winthrop Shaw Pittman LLP (57) ABSTRACT

A method is designed for recording contents information along a track of an optical disk of a writeable type. A volume detection step is carried out for detecting an actual volume of the contents information to be recorded into the optical disk. A capacity detection step is carried out for detecting a nominal capacity of the optical disk, which indicates a rated volume of information to be recorded at maximum. A density determination step is carried out for determining a recording density of the contents information based on the detected actual volume and the detected nominal capacity. A record step is carried out for recording the contents information into the optical disk at the determined recording density such that the actual volume of the contents information can fit into the nominal capacity of the optical disk.

2 Claims, 8 Drawing Sheets

FOREIGN PATENT DOCUMENTS

| | | |
|---|---|---|
| EP | 0584991 A | 3/1994 |
| EP | 1089281 A | 4/2001 |
| EP | 1244108 A | 9/2002 |
| GB | 2 359 185 A | 8/2001 |
| JP | 0399852 A | 5/1990 |
| JP | 05-122655 | 5/1993 |
| JP | 05-282730 | 10/1993 |
| JP | 60-76474 | 3/1994 |
| JP | 08167275 | 6/1996 |
| JP | 2001-014801 | 1/2001 |
| JP | 2002-025064 | 1/2002 |
| JP | 2002-542561 | 12/2002 |

* cited by examiner

|  | CASE1 | CASE2 | CASE3 | CASE4 |
|---|---|---|---|---|
| LINEAR VELOCITY (m/s) | 1.2 | 1.16 | 1.4 | 1.4 |
| MODULATING CLOCK SIGNAL MCK'(MHz) | 4.3218 | 4.4548 | 3.7044 | 3.7044 |
| VCO OSCILLATION FREQUENCY (MHz) | 276.5952 | 285.1058 | 237.0816 | 237.0816 |
| B | 43904 | 45255 | 37632 | 37632 |

FIG.10

| RANGE OF N/M | B |
|---|---|
| LESS THAN 1.0 | 45255 |
| 1.0~1.18 | 43904 |
| GREATER THAN 1.18 | 37632 |

FIG.11

OPTICAL DISK APPARATUS FOR RECORDING INFORMATION AT A RECORDING DENSITY PROPORTIONAL TO THE ACTUAL INFORMATION VOLUME AND DISK NOMINAL CAPACITY

BACKGROUND OF THE INVENTION

1. Technical Field of the Invention

The present invention relates to an optical disk recording method and optical disk recording apparatus in which contents information is recorded in optical disks such as a compact disk-recordable (CD-R) and CD-rewritable (CD-RW).

2. Related Art

In a recordable optical disk conforming to CD standard such as CD-R, a guide groove called a pregroove is formed beforehand along a track in a disk manufacturing process. The pregroove wobbles (meanders), and a wobbling frequency thereof is detected and subjected to frequency modulation (FM) with absolute time information called Absolute Time in Pregroove (ATIP).

During the recording of the contents information into the optical disk in which the pregroove is formed, a wobbling signal is extracted from a photo signal of a light reflected back from the optical disk, the wobbling signal is FM-demodulated to decode ATIP information, and an absolute position along the track on the disk is detected by the decoded ATIP information. Moreover, the detected absolute position information is used to record the contents information in the optical disk.

Additionally, types of optical disks having different recording capacities have been distributed. For example, with regard to CD-R, a disk having a recording capacity of 650 MB (megabyte) and another disk having a recording capacity of 540 MB have been marketed. The distributed CD-R having the nominal recording capacity of 650 MB and the CD-R having the nominal recording capacity of 540 MB have the same physical length of the recordable track, but these two types of the disks are different from each other in the operating speed regulated according to the progression of the absolute time information of the ATIP information extracted from the disks. That is, the track length for use in recording the absolute time information of the ATIP information differs between these two types of the disks. For example, the track length for use in storing the absolute time information of the ten minutes in the optical disk of 540 MB is larger than that of the optical disk of 650 MB. Therefore, the disks are different from each other in the recording density of the absolute time information. As a result, the recording capacity differs between these two types of the optical disks. That is, during the recording at a standard operation speed, the CD-R of 650 MB adopts a linear velocity of 1.2 m/s, the CD-R of 540 MB adopts a linear velocity of 1.4 m/s, and these linear velocities are referred to as rated linear velocities of the respective disks in the standard of the optical disk. Additionally, the "linear velocity" in the standard actually has the same meaning as the recording density. For example, the CD-R of 650 MB is different from the CD-R of 540 MB in the capacity to be recorded per unit track length. Namely, the CD-R of 650 MB is different from the CD-R of 540 MB in the recording density. The density of the CD-R of 650 MB is larger than that of the CD-R of 540 MB. The recording density obtained when the linear velocity is set to 1.2 m/s or 1.4 m/s during the recording at the standard operation speed is reciprocal to the linear velocity of 1.2 m/s or 1.4 m/s in the above-described standard. Therefore, the term "linear velocity" will be used hereinafter for representing the recording density. The value 1.4 m/s denotes an information recording pitch at the standard operation speed and therefore used for indicating the recording density in recording the information at the linear velocity of 1.4 m/s. In similar manner, the value 1.2 m/s denotes an information recording pitch at the standard operation speed and is used for indicating the recording density in recording the information at the linear velocity of 1.2 m/s. Theoretically, the greater the value of the linear velocity, the smaller the recording density, because the linear velocity is inversely proportional to the recording density.

At present, the CD-R disks having different recording capacities have been manufactured and marketed, and a user sometimes carries out works necessary for selecting the CD-R having the recording capacity which meets the data amount to be recorded. For example, the CD-R of 650 MB is selected in order to record music data for 74 minutes (CD-DA form: CD digital audio). The CD-R of 700 MB is selected to record music data for 80 minutes, and the CD-R of 540 MB is selected to record music data for 63 minutes or less. The disk selecting operation is troublesome, and further the user needs to prepare various types of CD-R disks beforehand. Moreover, when there is not available a CD-R having an appropriate recording capacity, laborious works of purchasing the CD-R having the corresponding capacity has to be performed. Furthermore, in general, as the recording linear density becomes smaller, it is possible to record the recording information with an improved quality level. However, in the conventional operation, when data of 550 MB is recorded in the CD-R of 650 MB, a recording area of 100 MB is left unused, and a technique of effectively using such an unused extra area has not been proposed.

SUMMARY OF THE INVENTION

The present invention has been developed in consideration of the above-described circumstances, and an object thereof is to provide an optical disk recording method and optical disk recording apparatus in which information can be preferably recorded in accordance with a capacity of data to be recorded and a capacity recordable in the optical disk.

To solve the above-described problem, according to the inventive method, the recording density can be changed based on the actual information volume to be recorded and the nominal information volume recordable in the optical disk (nominal recording capacity), and the information is recorded at the determined linear velocity such that the information can preferably be recorded in accordance with a relation between the actual information volume to be recorded and the nominal recordable information volume. For example, when the actual information volume to be recorded is small, the recording density is decreased, and thereby the recording with a higher quality level is possible. On the other hand, when the actual information volume to be recorded is large, the recording density is increased, and thereby data having a volume larger than the nominal recordable capacity can be recorded.

Moreover, according to another aspect of the present invention, there is provided a method of recording contents information along a track of an optical disk which is prerecorded with index information indicating progression of position or time along the track at a predetermined recording density. The inventive method comprises the steps of modulating an optical beam according to the contents information in response to a reference clock signal, irradiating the modulated optical beam along the track of the optical disk while rotating the optical disk at a variable rotation velocity so as to optically write the contents information into the optical disk, and adjusting either of a frequency of the reference clock signal and the rotation velocity of the optical disk so as to record the contents information at a recording density different from the predetermined recording density of the index information.

According to the inventive method, the rotational velocity of the optical disk during the recording and/or the frequency for use in modulating the information to be recorded is controlled, hence the information can be recorded with the recording density other than the predetermined default recording density set in the optical disk. For example, when the actual information volume to be recorded is small, the recording density is decreased, and thereby recording with a higher quality level is possible. On the other hand, when the actual information volume to be recorded is large, the recording density is increased, and thereby data having a volume larger than the nominal recordable information capacity can be recorded.

Furthermore, according to a further aspect of the present invention, there is provided a method of recording a volume of contents information along a track of an optical disk which is prerecorded with index information indicating progression of position or time along the track at a predetermined recording density to rate a capacity of the optical disk. The inventive method comprises the steps of determining a recording density based on an actual volume of the contents information to be recorded into the optical disk and the rated capacity of the optical disk, modulating an optical beam according to the contents information in response to a reference clock signal, irradiating the modulated optical beam along the track while rotating the optical disk at a variable rotation velocity so as to optically record the contents information, and adjusting either of a frequency of the reference clock signal and the rotation velocity of the optical disk when the determined recording density differs from the predetermined recording density for recording the contents information at the determined recording density such that the actual volume of the contents information can be compressed or expanded into the rated capacity of the optical disk.

According to the inventive method, the rotational velocity of the optical disk and/or the frequency for use in modulating the information to be recorded is controlled based on the actual information volume to be recorded and the nominal information volume recordable in the optical disk, hence the recording density can be changed freely without sticking to the predetermined default recording density set in the optical disk. The information is recorded at the determined linear velocity such that optimal recording is possible in accordance with the relationship between the actual information volume to be recorded and the nominal recordable information volume. For example, when the actual information volume to be recorded is small, the recording density is decreased, and thereby recording with a higher quality level is possible. On the other hand, when the actual information volume to be recorded is large, the recording density is increased, and thereby data having a capacity larger than the nominal recordable information capacity can be recorded.

Additionally, according to the present invention, there is provided an apparatus for recording contents information into a track of an optical disk of a writeable type. The inventive apparatus comprises a control unit for receiving data indicative of an actual volume of the contents information to be recorded into the optical disk and a nominal capacity of the optical disk, the nominal capacity being indicative of a rated volume of information to be recorded at maximum, a clock setting section that sets a frequency of a reference clock signal according to the actual volume of the contents information and the nominal capacity of the optical disk, a modulating section that modulates an optical beam according to the contents information in response to the set frequency of the reference clock signal, and an irradiating section that irradiates the modulated optical beam onto the track so as to optically write the contents information into the optical disk such that the actual volume of the contents information can be filled into the nominal capacity of the optical disk.

According to the constitution, the frequency of the reference clock signal for use in modulating the contents information to be recorded can be changed based on the actual information volume to be recorded and the nominal information volume recordable in the optical disk. When the frequency of the reference clock signal for use in the modulation is changed in this manner, the recording density can be accordingly changed, and the information can be recorded at the optimum linear velocity so as to perform the optimum recording in accordance with the relation between the actual information volume to be recorded and the nominal recordable information volume.

Moreover, according to the present invention, there is provided an apparatus for recording contents information into a track of an optical disk of a writeable type. The inventive apparatus comprises a control unit for receiving data indicative of an actual volume of the contents information to be recorded into the optical disk and a nominal capacity of the optical disk, the nominal capacity being indicative of a rated volume of information to be recorded at maximum, a rotation control section that rotates the optical disk at an angular velocity controlled according to the actual volume of the contents information and the nominal capacity of the optical disk, a modulating section that modulates an optical beam according to the contents information, and an irradiating section that irradiates the modulated optical beam onto the track so as to optically write the contents information into the optical disk which is rotated at the controlled angular velocity such that the actual volume of the contents information can be filled into the nominal capacity of the optical disk.

According to the constitution, the angular driving speed of the optical disk as a recording object can be changed based on the actual information volume to be recorded and the nominal information volume recordable in the optical disk. When the angular driving speed of the optical disk is changed in this manner, the recording density can be changed accordingly, and the information can be recorded at the corresponding linear velocity so as to perform the optimum recording in accordance with the relation between the actual information volume to be recorded and the nominal recordable information volume.

DETAILED DESCRIPTION OF THE INVENTION

Embodiments of the present invention will be described hereinafter with reference to the drawings.

A. Data Recording Method for Optical Disk

FIGS. 1 to 4 are explanatory diagrams illustrating a principle of a method of recording data in an optical disk (hereinafter referred to as CD-R) according to one embodiment of the present invention. The recording method of the data with respect to the optical disk according to the present embodiment will be described with reference to the drawings.

Figure 1:
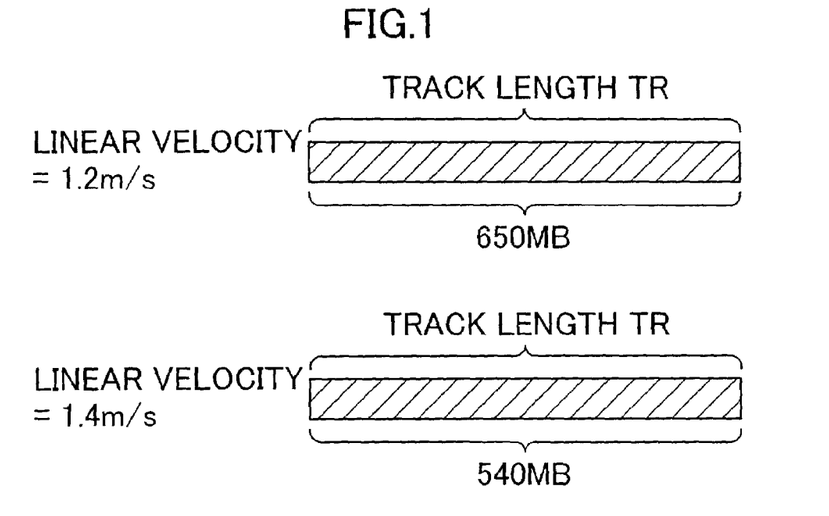
FIG. 1 is an explanatory diagram showing a principle of an optical disk recording method according to one embodiment of the present invention.

First, a basic principle of the recording method according to the present embodiment will be described. As shown in FIG. 1, for CD-R, a plurality of types of disks having the same track length TR (track length of a region in which contents information is recorded) and having different recording capacities are available, such as a disk with a recording capacity of 650 MB (rated linear velocity of 1.2 m/s) and a disk with a recording capacity of 540 MB (rated linear velocity of 1.4 m/s). To record the information in the CD-R, the information has heretofore been written in accordance with the rated linear velocity of the set CD-R. In the recording method according to the present embodiment, however, in accordance with the recording data capacity (hereinafter referred to as a disk capacity, or nominal capacity N) of the CD-R set in an optical disk recording apparatus, and a data amount to be recorded (hereinafter referred to as a recording data amount, or actual volume M), the information is recorded at an optimum recording linear velocity without being limited to the rated linear velocity of the CD-R.

The recording method based on the above-described basic principle will be described hereinafter in terms of three cases having the recording data amounts M of about 650 MB (Case 1), about 670 MB (Case 2), and about 540 MB (Case 3) for an object CD-R (upper optical disk of FIG. 1) which is set in the optical disk recording apparatus and which has the disk capacity N of about 650 MB (track length TR, rated linear velocity 1.2 m/s).

(Case 1) Recording Data Amount M=650 MB

Figure 2:
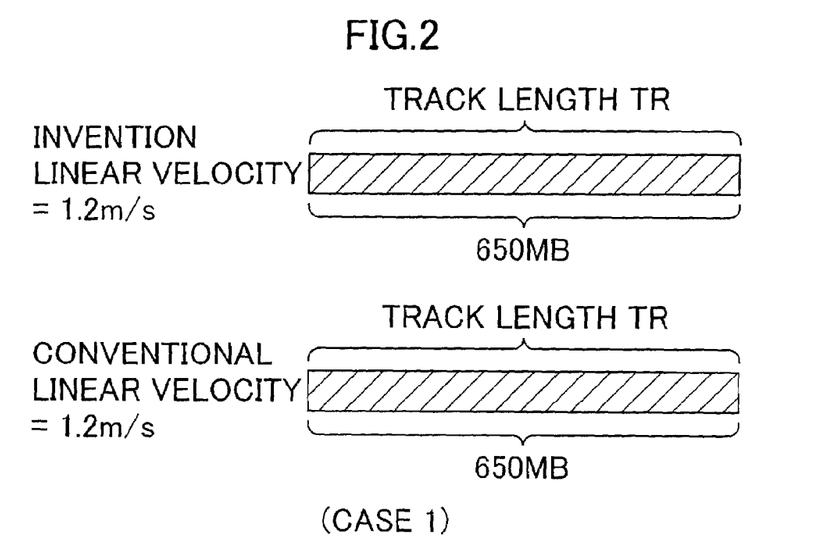
FIG. 2 is an explanatory diagram showing the principle of the optical disk recording method according to one embodiment of the present invention.

As shown in FIG. 2, in the case where the recording data amount M is 650 MB, that is, the disk capacity N agrees with the recording data amount M, the recording is performed at the linear velocity identical to the rated linear velocity (1.2 m/s) of the CD-R as the recording object. As a result, a program area in which the contents data of the CD-R can be recorded is all used (oblique lines in the drawing indicate a recorded area), and data of 650 MB is recorded. In the case where the disk capacity N agrees with the recording data amount M in this manner, similarly as the conventional recording method, the recording is carried out in the rated linear velocity.

(Case 2) Recording Data Amount M=670 MB

Figure 3:
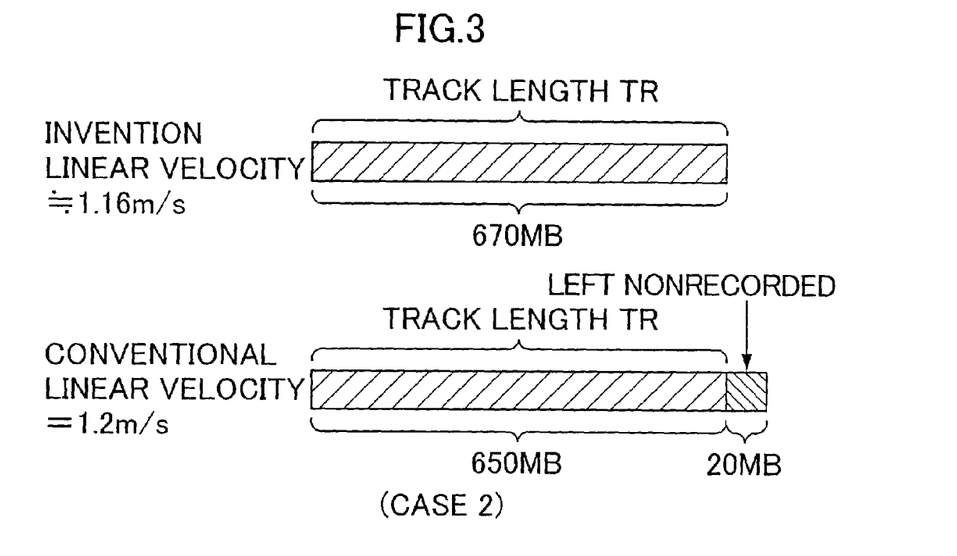
FIG. 3 is an explanatory diagram showing the principle of the optical disk recording method according to one embodiment of the present invention.

Subsequently, when the recording data amount M is 670 MB, that is, the recording data amount M is larger than the disk capacity N, and the large data amount M exceeding the disk capacity N is recorded, during a so-called over burn, as shown in FIG. 3, the linear velocity is set to 1.2×650/670 (about 1.16 m/s), not to the rated linear velocity (1.2 m/s) and the recording is performed. As a result, the recording data amount M (670 MB) can be recorded using all the program area (650 MB) of the CD-R. On the other hand, in the conventional recording method using the rated linear velocity, even when all the program area of the CD-R is used, the data for 20 MB cannot be recorded. On the other hand, in the recording method according to the present embodiment, when the information is recorded at the linear velocity lower than the rated linear velocity as described above, it is possible to record the data of 670 MB larger than the disk capacity N. Therefore, a recording error resulting from the over burn can be prevented from being generated, and the user does not have to perform a laborious operation of replacing the CD-R with a disk having a larger capacity.

(Case 3) Recording Data Amount M=540 MB

Figure 4:
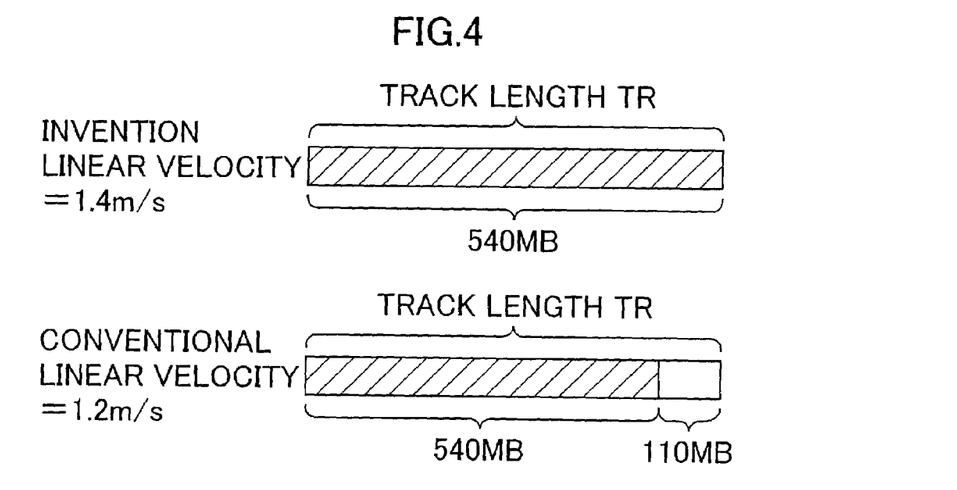
FIG. 4 is an explanatory diagram showing the principle of the optical disk recording method according to one embodiment of the present invention.

Subsequently, when the recording data amount M is 540 MB, that is, the recording data amount M is smaller than the disk capacity N, as shown in FIG. 4, the linear velocity is set to 1.2×650/550 (about 1.4 m/s), not to the rated linear velocity (1.2 m/s) and the recording is performed. As a result, the data of 540 MB can be recorded using all the program area (650 MB) of the CD-R. On the other hand, in the conventional recording method using the rated linear velocity, all the data can be recorded using the region for 540 MB in the program area, but an unrecorded area for 110 MB remains. Of course, even when the unrecorded area for 110 MB remains, the data recorded in the CD-R can be reproduced without any problem. However, in the present embodiment, for the following reason, when the recording data amount M is smaller than the disk capacity N, the information is recorded at the linear velocity (small recording density) higher than the rated linear velocity.

That is, it is considered that the recording with the higher quality level is possible by raising the linear velocity. When the disk capacity includes an extra region, the extra region is used and the recording density is lowered, so that data having a higher reproduction quality such as music data can preferably be recorded.

Figure 5:
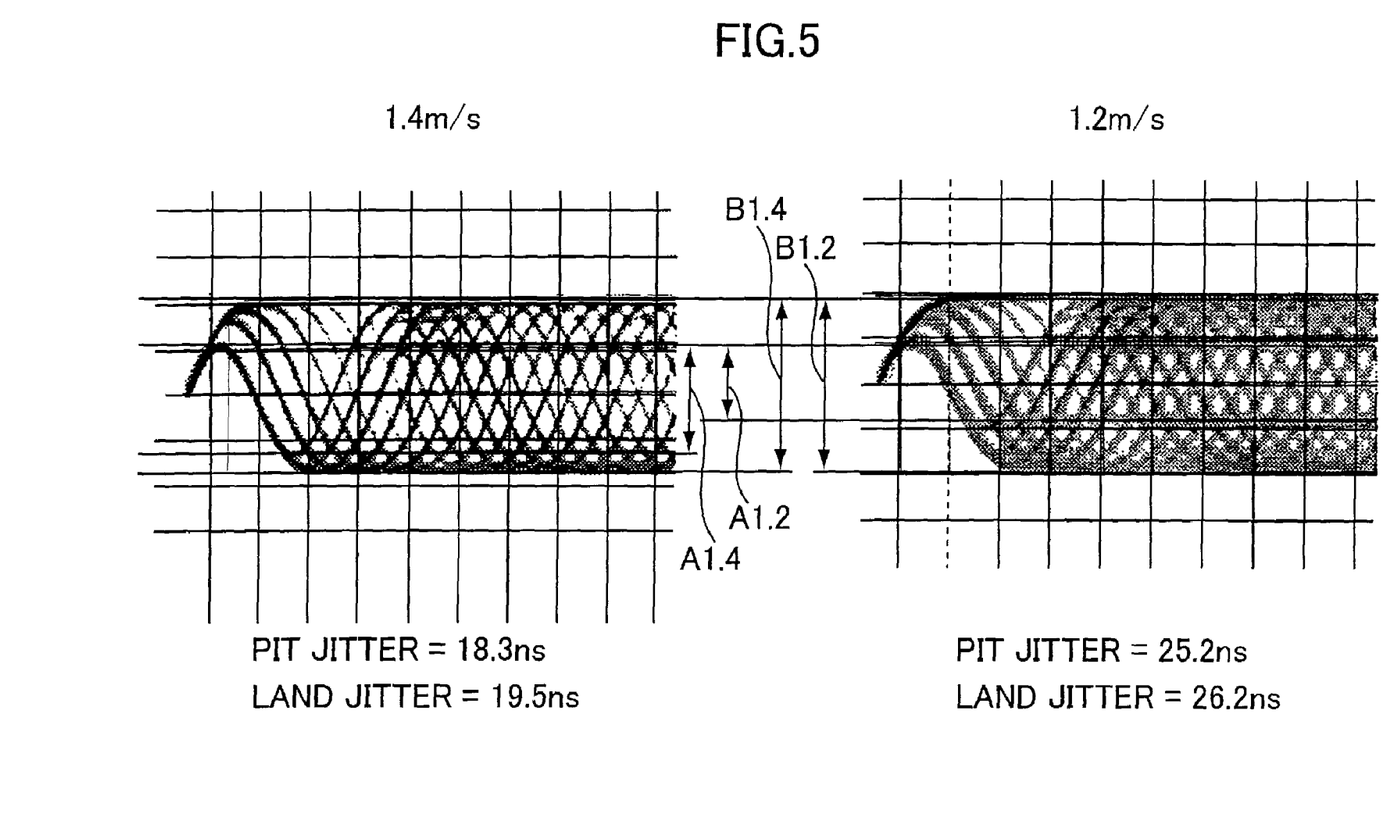
FIG. 5 is an explanatory diagram showing an effect achieved by the optical disk recording method, and illustrates an eye pattern obtained from a reproduction signal during the recording at different linear velocities.

To verify an influence of the reduced recording density on the recording quality level, the present inventor has obtained an eye pattern of an RF signal extracted from a reproduction signal during the recording at the linear velocity set to 1.4 m/s, and another eye pattern extracted from the reproduction signal during the recording at the linear velocity set to 1.2 m/s in the same CD-R, and the obtained result is shown in FIG. 5. In the two eye patterns shown in the drawing, upon comparing the eye patterns from pits of 3T (T is a reference clock) portions as a minimum pit length of the recording of the CD-R, it is apparent that an amplitude A 1.4 shown in the eye pattern obtained by the recording at the linear velocity of 1.4 m/s is greater than an amplitude A 1.2 at the linear velocity of 1.2 m/s. Moreover, from the experiment results, it is seen by the comparison that the amplitude of the 3T pit in the linear velocity of 1.4 m/s (small density) increases in this manner, and amplitudes B 1.4 and B 1.2 of long pits have little difference. That is, the long pit is hardly influenced by the linear velocity, whereas the short pit is largely influenced by the linear velocity. When the linear velocity is low, the amplitude further increases. Here, a pit signal which influences a precision of signal detection is in a portion below an amplitude center, and the portion is naturally proportional to the size of the amplitude, and is enlarged when the linear velocity is low as described above. Moreover, it is seen from the drawing that the eye pattern of the linear velocity of 1.4 m/s is represented more clearly than the eye pattern of 1.2 m/s. This shows that a jitter (standard deviation of a recording pit length and recording land length from a standard length) obtains a smaller value (the high quality level) during the recording at 1.4 m/s, and for an actual measurement result of the jitter value, a result obtained by the recording at the linear velocity of 1.4 m/s is superior. It is apparent from the experiment result that the recording with a higher quality level is possible by the reduction of the recording density (the recording at the higher linear velocity of 1.4 m/s rather than 1.2 m/s).

Figure 6:
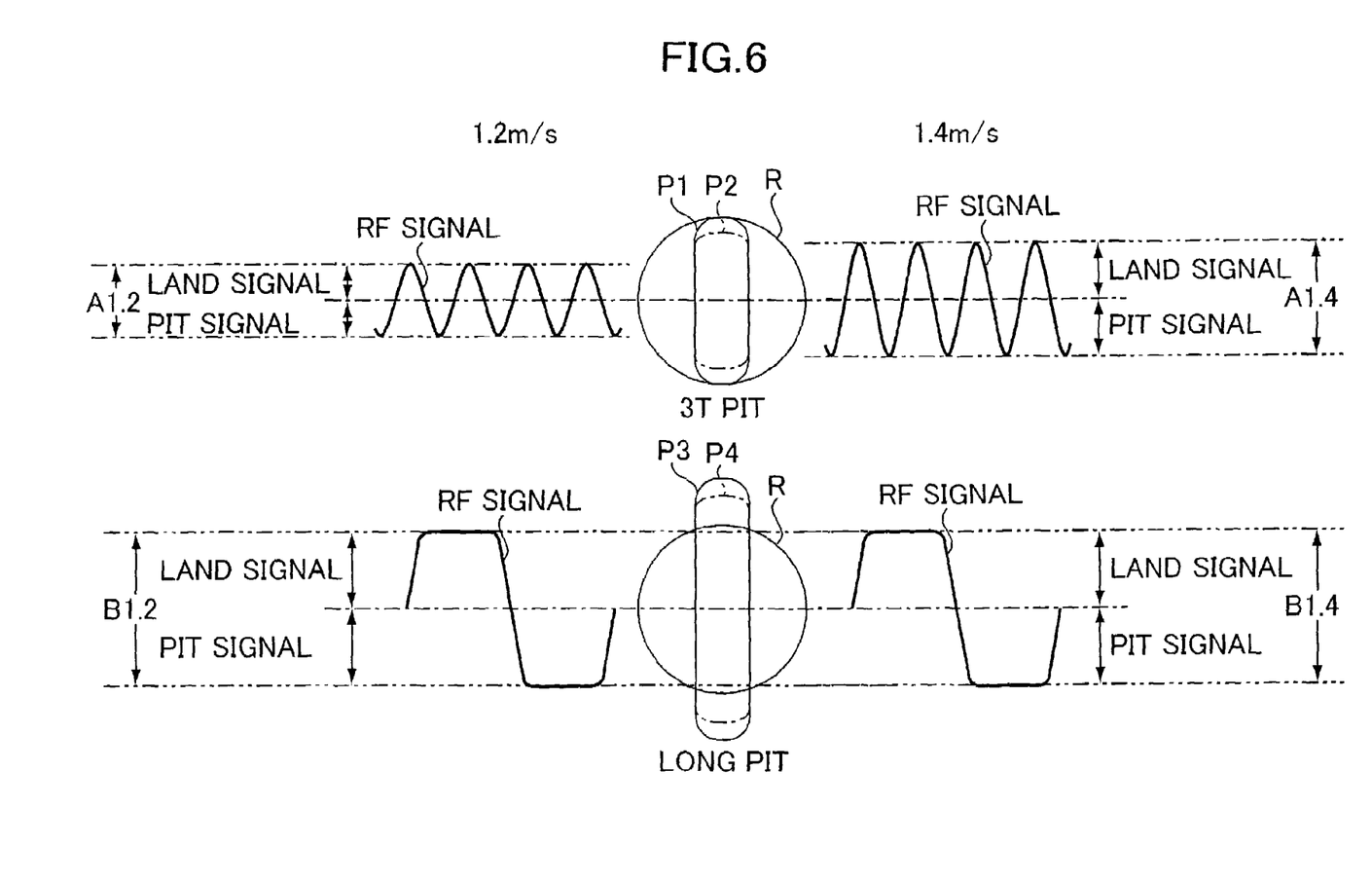
FIG. 6 is an explanatory diagram showing the effect achieved by the optical disk recording method.

As indicated in the above-described experimental result, when the recording density is decreased, the recording with the high quality level is possible for the following reason. In consideration of a relation between the 3T pit (minimum pit length) formed in the CD-R and a spot diameter of a laser beam with which the CD-R is irradiated, as shown in the upper part of FIG. 6, when the pit length of a pit P1 (shown by a solid line in the drawing) recorded at the linear velocity of 1.4 m/s is substantially equal to a spot diameter R, it is seen that the pit length of a pit P2 (shown by a one-dot chain line in the drawing) recorded at the linear velocity of 1.2 m/s is smaller than the spot diameter R. Such a dimensional relation between the pit length and the spot diameter R is caused by the above-described sizes of the amplitudes A 1.4 and A 1.2. Moreover, as shown in the lower part of FIG. 6, with the long pit (e.g., 11T), the pit length of a pit P3 (shown by a solid line in the drawing) recorded at the linear velocity of 1.4 m/s and that of a pit P4 (shown by a one-dot chain line in the drawing) recorded at the linear velocity of 1.2 m/s are greater than the spot diameter R. As a result, there is no substantial difference between the amplitudes B 1.2 and B 1.4.

As described above, when the recording density is decreased (the linear velocity is raised), the recording with a higher quality level is apparently performed. This is noticeable in the recording method according to the present embodiment. When the recording data amount M is smaller than the disk capacity N as described above, that is, when there is an extra disk capacity N, the extra region is used to record the information at the linear velocity higher than the rated linear velocity.

In consideration of the above-described respect, in the recording method according to the present embodiment, when the rated linear velocity of a CD-R 101 is L, a linear velocity LT for the recording is obtained by the following equation, the linear velocity is set to the obtained LT in principal, and the recording is performed.

$$LT = L \times N/M$$

When the information is recorded at the set linear velocity, and when the recording data amount M is larger than the disk capacity N, the recording data can all be recorded in the CD-R. On the other hand, when the recording data amount M is smaller than the disk capacity N, the extra region of the disk capacity N is used, and the recording with a higher quality level is possible. That is, according to the recording method of the present embodiment, the information can be recorded at an optimum linear velocity in accordance with the disk capacity N and recording data amount M without sticking to the rated linear velocity of the disk.

Additionally, in the above equation, N/M is described instead of M/N described in the claims, but this means that the great value of the "linear velocity" used in the specification indicates the small value of the "recording density". When the recording density is used as a unit instead of the "linear velocity", the equation is represented by $LT=L \times M/N$.

B. Optical Disk Recording Apparatus

The optical disk recording method according to the present embodiment has been described above, and an optical disk recording apparatus for carrying out the inventive optical disk recording method will be described hereinafter.

Figure 7:
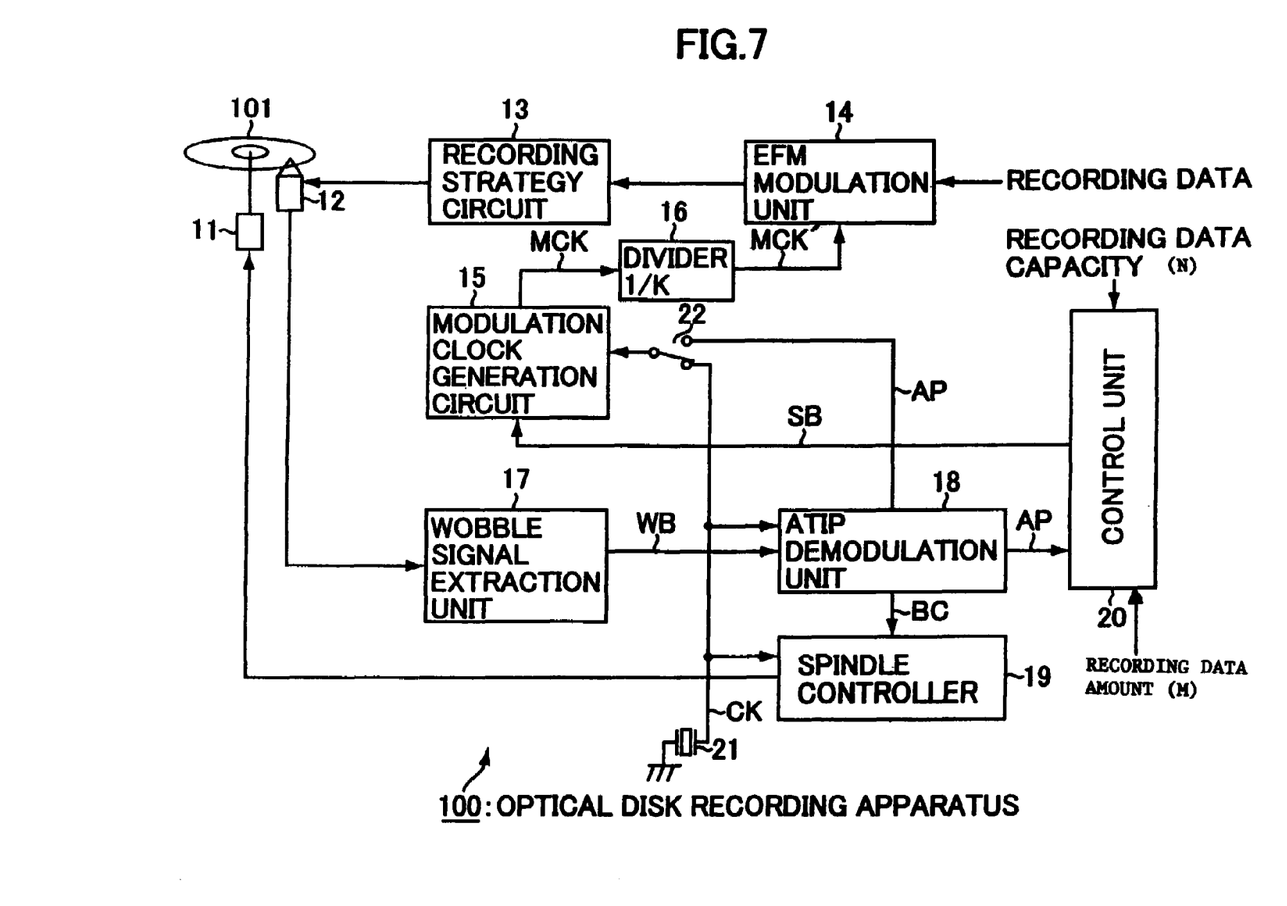
FIG. 7 is a block diagram showing the constitution of the optical disk recording apparatus designed for carrying out the optical disk recording method.

First, FIG. 7 is a block diagram showing the constitution of an optical disk recording apparatus 100 according to one embodiment of the present invention, and the optical disk recording apparatus 100 is connected to a host computer (not shown) and used. As shown in the drawing, the optical disk recording apparatus 100 includes a spindle motor 11, optical pickup 12, recording strategy circuit 13, EFM modulation unit (i.e. modulating section) 14, modulation clock generation circuit (i.e., clock setting section) 15, divider 16, wobble signal extraction unit 17, ATIP demodulation unit 18, spindle controller 19, control unit 20, crystal oscillator 21, and changeover switch 22.

The spindle motor 11 is a motor for rotationally driving an optical disk (CD-R in the present embodiment) as an object in which data is recorded. The optical pickup (irradiating means or section) 12 has an optical system including a laser diode, lens, mirror, and the like, and a return light receiving element. To record the data in the CD-R 101, the optical pickup irradiates a track of the CD-R 101 with a laser beam, receives a return light from the CD-R 101, and outputs an RF signal subjected to an eight-to-fourteen modulation (EFM) as a light receiving signal to the wobble signal extraction unit 17 via an RF amplifier (not shown).

The wobble signal extraction unit 17 extracts a wobble signal from the RF signal supplied from the optical pickup 12 via the RF amplifier and subjected to the EFM, and outputs the extracted wobble signal to the ATIP demodulation unit 18. As described above, a pregroove is formed along the track in the CD-R 101. Moreover, the pregroove wobbles, and the wobble signal extraction unit 17 extracts a wobbling signal WB as a component resulting from the wobbling from the RF signal supplied from the optical pickup 12.

The ATIP demodulation unit 18 demodulates the wobbling signal WB extracted by the wobble signal extraction unit 17, and extracts an ATIP signal AP and bi-phase clock BC. The ATIP demodulation unit 18 outputs the demodulated bi-phase clock BC to the spindle controller 19, and outputs the demodulated ATIP signal AP to the changeover switch 22 and control unit 20.

The spindle controller 19 uses the bi-phase clock BC supplied from the ATIP demodulation unit 18, and a clock signal CK supplied from the crystal oscillator 21 and having a predetermined frequency to drive the spindle motor 11. More concretely, the spindle controller 19 has a phase comparator and motor driver. The bi-phase clock BC is inputted into one input end of the phase comparator, and a signal obtained by dividing the clock signal CK at a predetermined dividing ratio is inputted into the other input end. As a result, an error signal is outputted to the motor driver from the phase comparator in accordance with a phase difference of both inputs, and the motor driver drives the spindle motor 11 in accordance with the error signal. When the spindle controller 19 drives the spindle motor 11 in this manner, the spindle motor 11 can rotate the CD-R 101 so as to maintain a linear velocity of the track relative to the beam spot constant regardless of the recording position of the CD-R 101. That is, a constant linear velocity (CLV) driving is possible.

When the information is recorded in the above-described CD-R of 650 MB (rated linear velocity of 1.2 m/s) with the standard operation speed defined in the CD standard, the frequency of the wobbling signal WB extracted by the wobble signal extraction unit 17 is 22.05 kHz, and the bi-phase clock BC and ATIP signal AP have a frequency of 6.3 kHz. Therefore, when the information is recorded in the CD-R 101 having the rated linear velocity of 1.2 m/s with the standard operation speed, the spindle controller 19 carries out spindle servo so as to set the frequency of the wobbling signal WB to 22.05 kHz, and the frequency of the bi-phase clock BC to 6.3 kHz. As a result, to perform the recording at the standard operation speed, the spindle motor 11 is driven so that the recording is performed at a linear velocity of 1.2 m/s, that is, the linear velocity agreeing with the rated linear velocity of the CD-R 101. Additionally, to perform the recording at higher operation speeds such as a double speed, and four-fold speed, the frequencies of the wobbling signal WB, bi-phase clock BC, and ATIP signal AP have values double or four times the above-described numeric values.

During the recording in a constant angular velocity (CAV) system, the ATIP signal AP from the ATIP demodulation unit 18 is supplied to the modulation clock generation circuit 15 via the changeover switch 22, and is used in generating a clock signal for modulation in the EFM modulation unit 14. On the other hand, during the recording in the CLV system, the changeover switch 22 is connected so that the clock signal CK from the crystal oscillator 21 is supplied to the modulation clock generation circuit 15.

The control unit (frequency setting means) 20 is constituted of a central processing unit (CPU), read only memory (ROM), random access memory (RAM), and the like, and all components of the optical disk recording apparatus 100 are controlled according to a program stored in the ROM so that a recording processing is executed. In this case, in addition to a control similar to a usual control of the general optical disk recording apparatus, the control unit 20 is constituted to perform the following characteristic control so that the recording is performed at an optimum linear velocity in accordance with the recording data amount M and the disk capacity N.

The control unit 20 recognizes the recording position by the optical pickup 12 based on the ATIP signal AP supplied from the ATIP demodulation unit 18, reads out ATIP special information and the like, recognizes a maximum lead-out start possible time (the last possible start position of the lead-out area in ATIP time code) of the CD-R 101 indicated in the ATIP special information, and detects the disk capacity N as the data amount recordable in the CD-R 101 based on the recognized maximum lead-out start time. As described above, when the CD-R 101 is a disk having a rated linear velocity of 1.2 m/s, the CD-R 101 can be detected to be a disk having a recording capacity of 650 MB from the maximum lead-out start possible time indicated in the ATIP special information.

The control unit 20 supplies a control signal SB for setting the dividing ratio of the divider in the modulation clock generation circuit 15 described later based on the detected recording capacity of the CD-R 101 (hereinafter referred to as a disk capacity) and the actual volume of the data to be recorded supplied from the host computer (hereinafter referred to as the recording data amount). That is, the control unit 20 derives the dividing ratio of the divider in the modulation clock generation circuit 15 based on the disk capacity of the CD-R 101 and the recording data amount, and outputs the control signal SB for setting the derived dividing ratio to the modulation clock generation circuit 15.

The modulation clock generation circuit 15 uses the control signal SB supplied from the control unit 20 and the clock signal CK having a predetermined period supplied from the crystal oscillator 21, generates a modulating clock signal MCK for use in the EFM modulation of the recording data in the EFM modulation unit 14, and outputs the signal to the divider 16. The modulating clock signal MCK is divided into 1/K (fixed value) by the divider 16, and the divided modulating clock signal MCK' is supplied to the EFM modulation unit 14 and used in the EFM modulation of the recording data.

Figure 8:
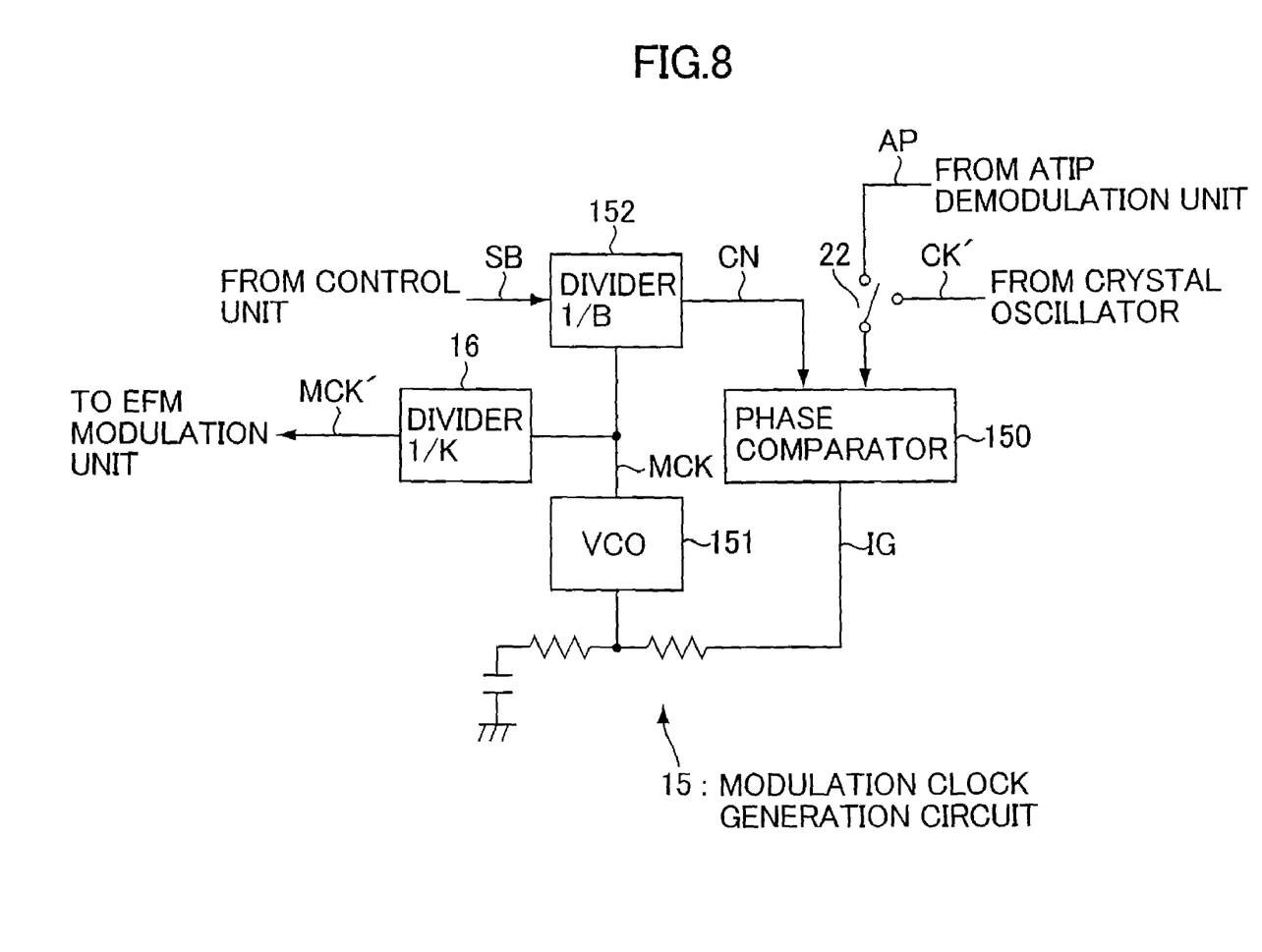
FIG. 8 is a block diagram showing the constitution of a modulation clock generation circuit as a constituting element of the optical disk recording apparatus.

As shown in FIG. 8, the modulation clock generation circuit 15 has a phase comparator 150, voltage controlled oscillator (VCO) 151, and divider 152.

A signal is inputted into one input end of the phase comparator 150 in accordance with a connection state of the changeover switch 22. In the present embodiment, the changeover switch 22 is connected to a crystal oscillator 21 side during the recording in a CLV system, and the changeover switch 22 is connected to the ATIP demodulation unit 18 during the recording in a CAV system. Here, the recording in the CLV system is described as an example, and a clock signal CK' obtained by dividing the clock signal CK supplied from the crystal oscillator 21 with the predetermined dividing ratio is inputted into one input end of the phase comparator 150. For example, when the recording is performed at the standard operation speed, the frequency of the clock signal CK' supplied to one input end of the phase comparator 150 is 6.3 kHz. The frequency is 12.6 kHz at the double operation speed, and 25.2 kHz at the four-fold operation speed, and the frequency also increases in proportion to the multiple operation speed.

A clock signal CN outputted from the divider 152 is supplied to the other input end of the phase comparator 150. The dividing ratio of the divider 152 can optionally be varied, and the dividing ratio (1/B) is set in accordance with the control signal SB supplied from the above-described control unit 20 (see FIG. 7). Therefore, the clock signal CN obtained by dividing the modulating clock signal MCK outputted from the voltage controlled oscillator 151 at (1/B) is supplied to the other input end of the phase comparator 150. The phase comparator 150 outputs a phase error signal IG of the clock signal CN and clock signal CK' (6.3 kHz at the standard operation speed) to the voltage controlled oscillator 151. The voltage controlled oscillator 151 is driven by the phase error signal IG. That is, an oscillation frequency of the voltage controlled oscillator 151 is controlled so that the phase of the clock signal CN outputted from the divider 152 agrees with the phase of the clock signal CK'.

After the modulating clock signal MCK outputted from the voltage controlled oscillator 151 having the oscillation frequency thereof controlled in this manner is divided into (1/K) by the divider 16, a divided modulating clock signal MCK' is supplied as a reference clock signal for modulation to the EFM modulation unit 14 (see FIG. 7).

As described above, the modulation clock generation circuit 15 controls the frequency of the modulating clock signal MCK outputted to the EFM modulation unit 14 via the divider 16 in accordance with the control signal SB supplied from the control unit 20 shown in FIG. 7. In other words, in the optical disk recording apparatus 100, the frequency of the reference clock signal for modulation supplied to the EFM modulation unit 14 is set under the control of the control unit 20 based on the recording data amount M to be recorded and the recordable disk capacity N. Additionally, details concerning the dividing ratio and the like of the divider 152 set by the control signal SB will be described later.

The EFM modulation unit 14 subjects the data to be recorded supplied from the host computer (not shown) to EFM modulation using the modulating clock signal MCK' supplied from the modulation clock generation circuit 15 via the divider 16 as a reference clock (so-called 1T clock), and outputs an EFM-modulated signal to the recording strategy circuit 13.

The recording strategy circuit 13 subjects the EFM signal supplied from the EFM modulation unit 14 to a time axis correction processing and the like, and outputs the signal to a laser driver (not shown). The laser driver drives the laser diode of the optical pickup 12, and the CD-R 101 is irradiated with the laser beam corresponding to the data to be recorded supplied from the host computer.

As described above, in the optical disk recording apparatus 100, the spindle motor 11 for driving the CD-R 101 is controlled so as to rotate the CD-R 101 at the speed following the rated linear velocity similarly as the conventional recording apparatus. On the other hand, the reference clock for use in the EFM modulation by the EFM modulation unit 14 is changed in accordance with the relation between the recording data amount M and the disk capacity N, and the effective linear velocity of the CD-R 101 or the recording density is changed to an optimum value in accordance with the relation between the disk capacity N and the recording data amount M as illustrated in the above-described three cases.

C. Concrete Example

As described above, in the optical disk recording apparatus 100, the linear velocity is appropriately changed in accordance with the relation between the disk capacity N and the recording data amount M for the recording. To change the linear velocity in this manner, the control unit 20 controls and sets the dividing ratio (1/B) of the divider 152 of the phase comparator 150 in accordance with the relation between the disk capacity N and the recording data amount M. In the following, the above-described three cases, that is, the recording data amounts M of about 650 MB (Case 1), about 670 MB (Case 2), and about 540 MB (Case 3), and the recording data amount M of 500 MB (Case 4) are used as examples, while the CD-R set in the optical disk recording apparatus has a nominal disk capacity N of about 650 MB (rated linear velocity of 1.2 m/s). These examples are described using concrete numeric values.

(Case 1) Recording Data Amount M=650 MB

When the recording data amount M is 650 MB, that is, when the disk capacity N meets the recording data amount M, similarly as the conventional optical disk recording apparatus, the recording is performed at the linear velocity identical to the rated linear velocity (1.2 m/s) of the CD-R as the recording object.

Figure 9:
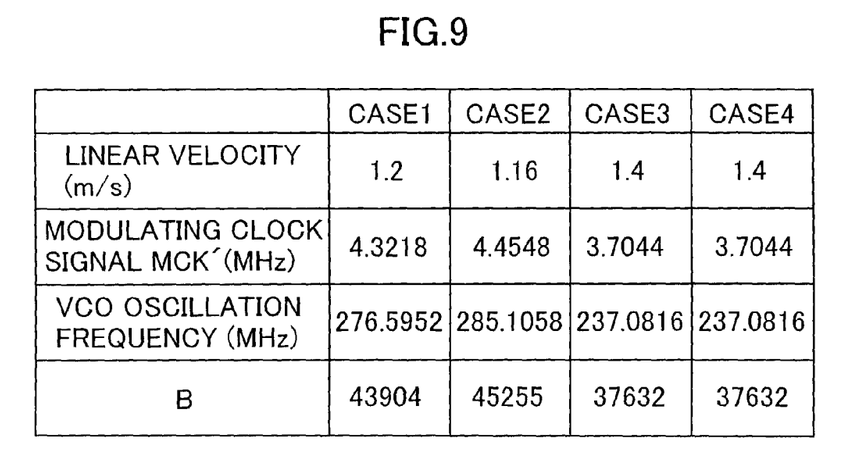
FIG. 9 is an explanatory table diagram showing a dividing ratio set in a divider of the modulation clock generation circuit in order to carry out the optical disk recording method.

Here, the modulating clock signal MCK' and the dividing ratio of the divider 152 will be described in a case where the recording is performed with respect to the CD-R 101 (disk capacity N=650 MB) having the rated linear velocity=1.2 m/s at the rated linear velocity of 1.2 m/s with reference to FIG. 9 and FIG. 8 described above. Additionally, in the following description, the numeric values for setting the frequency and dividing ratio will be described in the case where the recording speed is set to the standard operation speed (basic speed). When the recording is performed at the multiple speeds such as the double speed and four-fold speed, the respective numeric values are proportional to the multiple speed.

When the recording is performed at the rated linear velocity of 1.2 m/s as the standard operation speed, the frequency of the modulating clock signal MCK' for use in the modulation of the EFM modulation unit 14 is 4.3218 MHz, and the frequency of the clock signal CK' is 6.3 kHz. Moreover, when the oscillation frequency of the voltage controlled oscillator 151 is 276.5952 MHz, value B=43904, and K=64 of the dividing ratio (1/K) of the divider 16. That is, in Case 1, the oscillation frequency of the voltage controlled oscillator 151 is divided into 1/43904 by the divider 152. As a result, similarly as the conventional optical disk recording apparatus, the clock signal CK' of 4.3218 MHz is supplied to the EFM modulation unit 14. Therefore, in Case 1, the control unit 20 outputs the control signal SB such that the dividing ratio of the divider 152 is set to 1/43904.

(Case 2) Recording Data Amount M=670 MB

When the recording data amount M is 670 MB, the recording information is recorded at the effective linear velocity of about 1.16 m/s as described above, and therefore the modulating clock signal MCK' supplied to the EFM modulation unit 14 has a frequency of 4.3218×670/650=4.4548 MHz. Therefore, the frequency of the modulating clock signal MCK oscillated from the voltage controlled oscillator 151 is 4.4548×64 (K)=285.1058 MHz. As a result, the value B for use in setting the dividing ratio of the divider 152 is 285.1058 MHz/6.3 kHz=45255. Therefore, in Case 2, the control unit 20 outputs the control signal SB such that the dividing ratio of the divider 152 is set to 1/45255.

(Case 3) Recording Data Amount M=540 MB

When the recording data amount M is 540 MB, the recording is performed at the effective linear velocity of about 1.4 m/s as described above, and the modulating clock signal MCK' supplied to the EFM modulation unit 14 has a frequency of 4.3218×1.2/1.4=3.7044 MHz. Therefore, the frequency of the modulating clock signal MCK oscillated from the voltage controlled oscillator 151 is 3.7044×64 (K)=237.0816 MHz. As a result, the value B for use in setting the dividing ratio of the divider 152 is 237.0816 MHz/6.3 kHz=37632. Therefore, in Case 2, the control unit 20 outputs the control signal SB such that the dividing ratio of the divider 152 is set to 1/37632.

(Case 4) Recording Data Amount M=500 MB

When the recording data amount M is 500 MB, similarly as Case 3 described above, the linear velocity is set to be higher than the rated linear velocity (1.2 m/s) and the recording is performed. Similarly as Case 3 described above, the determined linear velocity is 1.2×650/500=1.56 m/s. Therefore, similarly as Case 2 or Case 3 described above, the linear velocity may be set to 1.56 m/s in order to perform the recording, but it is stipulated in the existing CD standard (Red Book) that the recording be performed at the linear velocity of 1.4 m/s or less. In consideration of the stipulation of the standard, in the optical disk recording apparatus 100, when the linear velocity determined as described above is higher than 1.4 m/s, the linear velocity is set to 1.4 m/s and the recording is performed. Therefore, the value B for setting the dividing ratio of the divider 152 is identical to the value (37632) of Case 3 described above, and the control unit 20 outputs the control signal SB such that the dividing ratio of the divider 152 is set to 1/37632.

The control unit 20 in the optical disk recording apparatus 100 generates the control signal SB for setting the dividing ratio of the divider 152 from the relation between the disk capacity N and the recording data amount M as described above. When the control signal SB is outputted and the dividing ratio of the divider 152 is set, and when the recording data amount M is larger than the disk capacity N, all the recording data can be compressed and filled in the CD-R. On the other hand, when the recording data amount M is smaller than the disk capacity N, the extra region of the disk capacity N is used and the recording with a higher quality level is possible by expanding the data and filling the tracks. Therefore, according to the optical disk recording apparatus 100, the data can be recorded at the optimum linear velocity in accordance with the relation between the disk capacity N and the recording data amount M without sticking to the rated linear velocity of the disk.

D. Modification Example

Additionally, the present invention is not limited to the above-described embodiments, and can variously be modified as illustrated hereinafter.

Modification Example 1

In the above-described embodiment, the recording is basically performed at a linear velocity determined by L×N/M, assuming that the disk capacity is N, the recording data amount is M, and the rated linear velocity of the disk is L. However, when it is possible to select any one of a plurality of values of linear velocities (e.g., three values such as 1.16 m/s, 1.2 m/s, and 1.4 m/s) beforehand and perform the recording, the tentative linear velocity LT obtained by the above-described L×N/M is used as a reference, the closest linear velocity is selected, and the recording may be performed at the selected linear velocity.

Additionally, in the above equation, N/M is described although M/N is described in the claims. This is because the large value of the "linear velocity" used in the specification means the small value of the "recording density". When the recording density is used as the unit instead of the "linear velocity", the above equation is represented as LT=L×M/N.

When the method of selecting the optimum linear velocity from the plurality of linear velocities as described above is used, a table shown in FIG. 10 may be stored in the ROM of the control unit 20 of the optical disk recording apparatus 100. As shown in the drawing, in the table, a range of values which can be taken by the disk capacity N/recording data amount M, and the values B for setting the dividing ratio of the divider 152 are associated with each other and stored in the memory. Moreover, N/M is computed from the disk capacity N and recording data amount M obtained by the control unit 20, and the value B associated with the range which agrees with the value of the N/M is selected.

Figure 10:
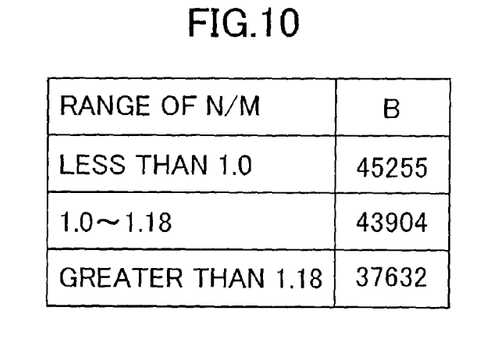
FIG. 10 is an explanatory diagram showing contents of a table stored in a ROM of a control unit in a modification example of the optical disk recording apparatus.

For example, when the disk capacity N is 650 MB, and the recording data amount M is 670 MB, N/M is less than 1.0, B=45292 is therefore selected, and the dividing ratio of the divider 152 is set to 1/45292 (the same as Case 2). Thereby, similarly as Case 2 described above, the recording is performed at the linear velocity of about 1.16 m/s. Moreover, when the disk capacity N=650 MB, and the recording data amount M=540 MB, N/M is greater than 1.18, B=37632 is therefore selected, and the dividing ratio of the divider 152 is set to 1/37632 (the same as Case 3). Thereby, similarly as Case 3 described above, the recording is performed at the linear velocity of 1.4 m/s.

Modification Example 2

Moreover, in the above-described embodiment, the optical disk recording apparatus 100 controls the spindle motor 11 to drive the CD-R 101 at the speed following the rated linear velocity similarly as the conventional recording apparatus. On the other hand, when the reference clock for use in the EFM modulation is changed, the linear velocity (recording density) is effectively changed. This is not the limited example, and the method may include: using the signal of the frequency following the rated linear velocity in the reference clock for use in the EFM modulation by the EFM modulation unit 14 (the same as the conventional recording apparatus), and rotating the CD-R 101 at the variable speed different from the rated linear velocity of the CD-R 101, so that the linear velocity may be changed.

Figure 11:
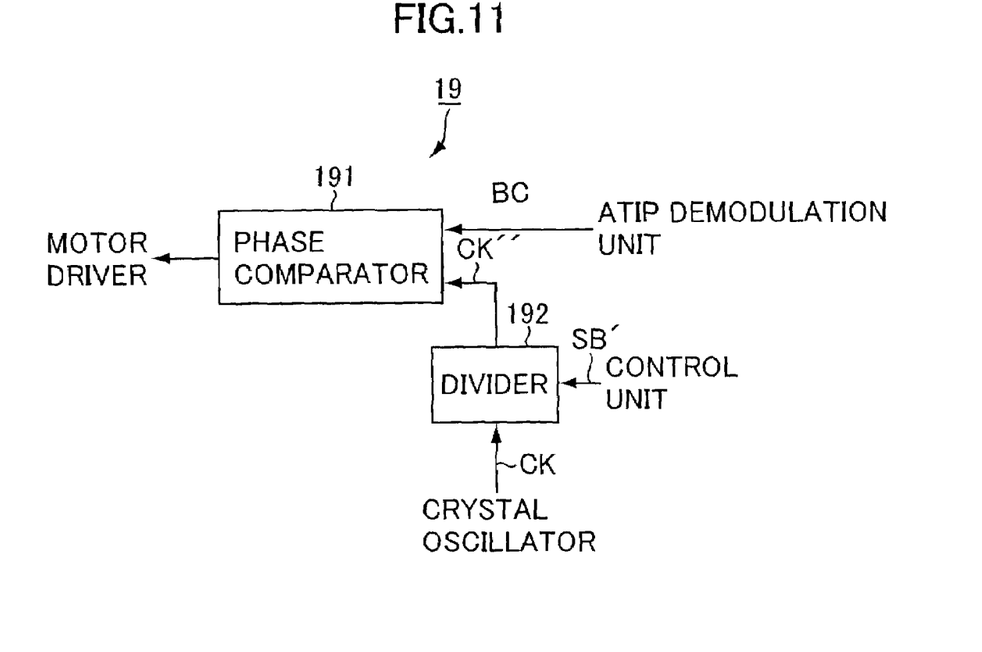
FIG. 11 is a diagram showing the constitution of a spindle controller of the optical disk recording apparatus designed for carrying out the optical disk recording method by another method.

When the CD-R 101 is rotated and driven at the speed different from the rated linear velocity of the CD-R 101 as described above, the control unit (driving control means) 20 may control the spindle controller 19 in accordance with the relation between the disk capacity N and the recording data amount M. Here, FIG. 11 shows the constitution of the spindle controller 19. As shown in the drawing, the spindle controller 19 has a phase comparator 191 and divider 192. The dividing ratio of the divider 192 is set by a control signal SB' supplied from the control unit 20, and the clock signal CK supplied from the crystal oscillator 21 is divided at the set dividing ratio. The divided clock signal CK" is inputted into one input end of the phase comparator 191.

The bi-phase clock BC supplied from the ATIP demodulation unit 18 is inputted into the other input end of the phase comparator 191. The phase comparator 191 outputs the error signal to the motor driver (not shown) in accordance with the phase difference of both inputs, and the motor driver drives the spindle motor 11 in accordance with the error signal. That is, when the dividing ratio of the divider 192 is changed, the rotational velocity of the CD-R 101 by the spindle motor 11 can be changed. Therefore, when the control unit 20 outputs the control signal SB' for rotating and driving the CD-R 101 so as to perform the recording at the linear velocity in accordance with the relation between the disk capacity N and the recording data amount M, similarly as the above-described optical disk recording apparatus 100, the recording can be performed at the optimum linear velocity in accordance with the relation between the disk capacity N and the recording data amount M.

MODIFICATION EXAMPLE

Additionally, in the optical disk recording apparatus 100, the CPU of the control unit 20 executes a recording process including a processing for setting the linear velocity in accordance with the relation between the disk capacity N and the recording data amount M according to the program stored beforehand in the ROM, but a control circuit constituted by a dedicated hardware may perform the process similarly as described above. Moreover, various recording mediums such as a CD-ROM and floppy disk in which the program for allowing a computer to realize the above-described processing may be presented to the user, or the program may be presented to the user via transmission mediums such as Internet. For example, the program for performing the processing installed in an electrically erasable and programmable ROM (EEPROM) of the conventional optical disk recording apparatus via the recording medium or the transmission medium may be updated so that the processing similar to that of the above-described optical disk recording apparatus 100 is performed.

As described above, according to the present invention, an optimum recording can be performed in accordance with a volume of data to be recorded and a capacity recordable in an optical disk.

What is claimed is:

1. An apparatus for recording contents information into a track of an optical disk of a writeable type, comprising:
    a control unit for receiving data indicative of an actual volume of the contents information to be recorded into the optical disk and a nominal capacity of the optical disk, said nominal capacity being indicative of a rated volume of information to be recorded at maximum;
    a clock setting section that sets a frequency of a reference clock signal according to the actual volume of the contents information and the nominal capacity of the optical disk;
    a modulating section that modulates an optical beam according to the contents information in response to the set frequency of the reference clock signal; and
    an irradiating section that irradiates the modulated optical beam onto the track so as to optically write the contents information into the optical disk such that the actual volume of the contents information can be filled into the nominal capacity of the optical disk,
    wherein the optical disk is prerecorded with index information indicating progression of position or time along the track at a predetermined recording density, and wherein the clock setting section sets the frequency of the reference clock signal so as to enable the recording of the contents information at an adjusted recording density different from the predetermined recording density, said adjusted recording density being represented by a value $L \times M/N$, where M denotes the actual volume, N denotes the nominal capacity and L denotes the predetermined recording density.

2. The apparatus according to claim 1, wherein the clock setting section operates when the value $L \times M/N$ is smaller than a lower limit value for setting the frequency of the reference clock signal so as to enable the recording of the contents information at the adjusted recording density having the lower limit value.

* * * * *